United States Patent
Gilpin

(10) Patent No.: US 8,467,660 B2
(45) Date of Patent: Jun. 18, 2013

(54) VIDEO TAGGING SYSTEM

(76) Inventor: Ash K. Gilpin, Virginia Beach, VA (US)

( * ) Notice: Subject to any disclaimer, the term of this patent is extended or adjusted under 35 U.S.C. 154(b) by 105 days.

(21) Appl. No.: 13/215,618

(22) Filed: Aug. 23, 2011

(65) Prior Publication Data

US 2013/0051754 A1  Feb. 28, 2013

(51) Int. Cl.
*H04N 5/92* (2006.01)
*H04N 5/93* (2006.01)

(52) U.S. Cl.
USPC .......................................... 386/241; 386/240

(58) Field of Classification Search
USPC .......................... 386/241, 239, 245, 248, 326
See application file for complete search history.

(56) References Cited

U.S. PATENT DOCUMENTS

| | | |
|---|---|---|
| 2004/0233233 A1 | 11/2004 | Salkind et al. |
| 2008/0034295 A1 | 2/2008 | Kulas |
| 2008/0184121 A1 | 7/2008 | Kulas |
| 2009/0006208 A1 | 1/2009 | Grewal et al. |
| 2009/0006937 A1 | 1/2009 | Knapp et al. |
| 2009/0019491 A1 | 1/2009 | Kulas |
| 2009/0043654 A1 | 2/2009 | Bates |
| 2009/0092374 A1* | 4/2009 | Kulas .............................. 386/95 |
| 2009/0094520 A1 | 4/2009 | Kulas |
| 2010/0023405 A1 | 1/2010 | Liu |
| 2011/0075990 A1 | 3/2011 | Eyer |

\* cited by examiner

*Primary Examiner* — Robert Chevalier
(74) *Attorney, Agent, or Firm* — Welsh Flaxman & Gitler LLC

(57) ABSTRACT

A video tagging system allows users to actively interact with video content. The video staging system includes a server hosting a website providing users with an interface through which users may interact with the video tagging system. The video staging system also includes a tag information database maintaining information regarding tags created by users. The interface includes a video player upon which video content is displayed as a video and a tag display presenting tags associated with the video. The video content and the information regarding tags are maintained separately.

18 Claims, 17 Drawing Sheets

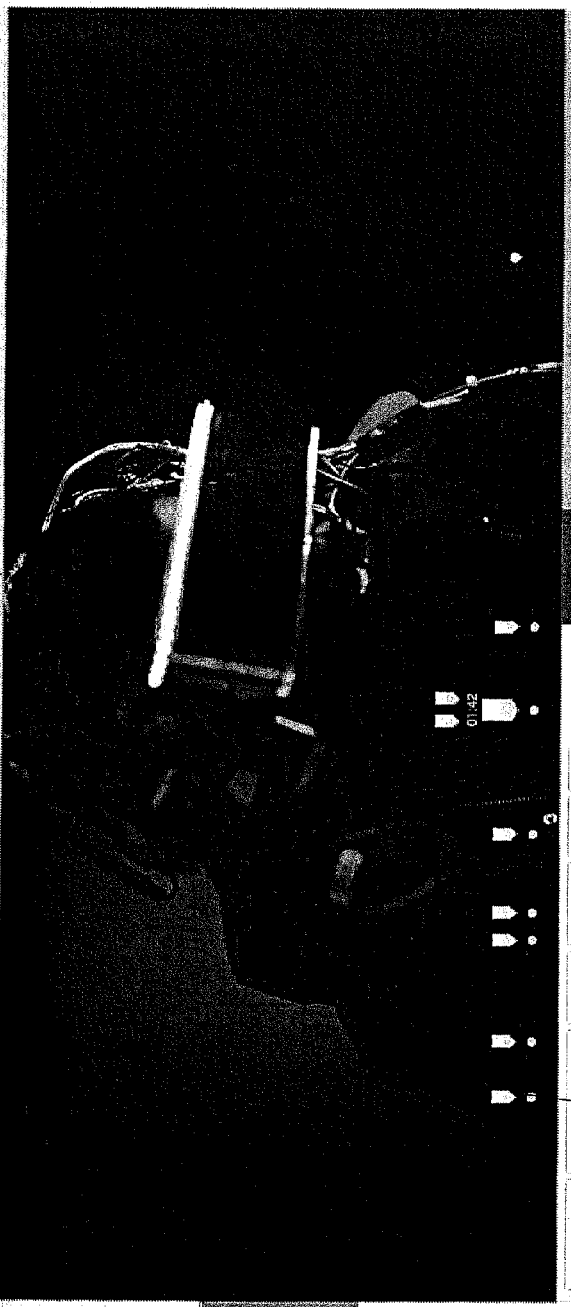
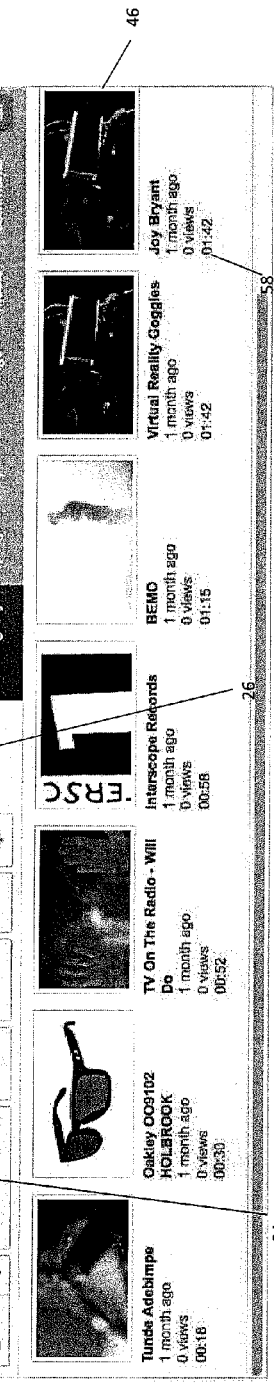
FIG. 8

FIG. 13

VIDEO TAGGING SYSTEM

BACKGROUND OF THE INVENTION

1. Field of the Invention

The invention relates to a web based video tagging system.

2. Description of the Related Art

Current video tagging systems integrate the tags with the video. The integrated tags are also often presented in a manner which covers the video as it is being played. These current mechanisms for tagging severely limit the ability of user to share and explore information associated with videos of interest.

SUMMARY OF THE INVENTION

It is, therefore, an object of the present invention to provide a video tagging system allowing users to actively interact with video content. The video staging system includes a server hosting a website providing users with an interface through which users may interact with the video tagging system. The video staging system also includes a tag information database maintaining information regarding tags created by users. The interface includes a video player upon which video content is displayed as a video and a tag display presenting tags associated with the video. The video content and the information regarding tags are maintained separately.

It is also an object of the present invention to provide a video tagging system wherein the information regarding tags is stored separately from video content.

It is another object of the present invention to provide a video tagging system wherein the tags are displayed outside of the video player.

It is a further object of the present invention to provide a video tagging system wherein the video content is stored on the server and is uploaded to the server.

It is also an object of the present invention to provide a video tagging system wherein the video content is stored on a third party site and imported to the server.

It is another object of the present invention to provide a video tagging system wherein the video content is maintained on a third party site and is accessed via a frameset application.

It is a further object of the present invention to provide a video tagging system wherein the interface includes a Create Tag button allowing a user to create a tag relating to the video and the tag is stored in the tag information database.

It is also an object of the present invention to provide a video tagging system wherein the tag is embedded in a third party site.

It is another object of the present invention to provide a video tagging system wherein the tag includes a title, an image, an information URL, a purchase URL, a description, or keywords associated with the video.

It is a further object of the present invention to provide a video tagging system wherein the tag is highlighted as a timed relationship of the tag with the video approaches and passes.

It is also an object of the present invention to provide a video tagging system wherein the video tagging system is web based.

It is another object of the present invention to provide a video tagging system wherein the tag information database is maintained on the server.

It is a further object of the present invention to provide a video tagging system including a tracking module that tracks all click-throughs of tags.

It is also an object of the present invention to provide a video tagging system wherein the interface includes a toolbar including buttons for filtering tags, an embed button, a flag button, a share button, a remove favorite button, and a like/dislike button.

It is another object of the present invention to provide a method for video tagging comprised of the following steps: watching a video; prompting a user to identify a tag type for a tag being created; prompting the user to provide additional information regarding the tag; and storing information relating the tag separately from a related video.

It is a further object of the present invention to provide a method wherein the tag type is selected from the group consisting of a person, a place, a thing, music and a comment.

It is also an object of the present invention to provide a method wherein the additional information is selected form the group consisting of a title, an image, an information URL, a purchase URL, a description, and keywords.

It is another object of the present invention to provide a method wherein the tag is synchronized with the video.

It is a further object of the present invention to provide a method including the step of embedding the tag on a third party site.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 2-16 are various screen shots relating to operation of the present system.

DESCRIPTION OF THE PREFERRED EMBODIMENTS

Figure 1:
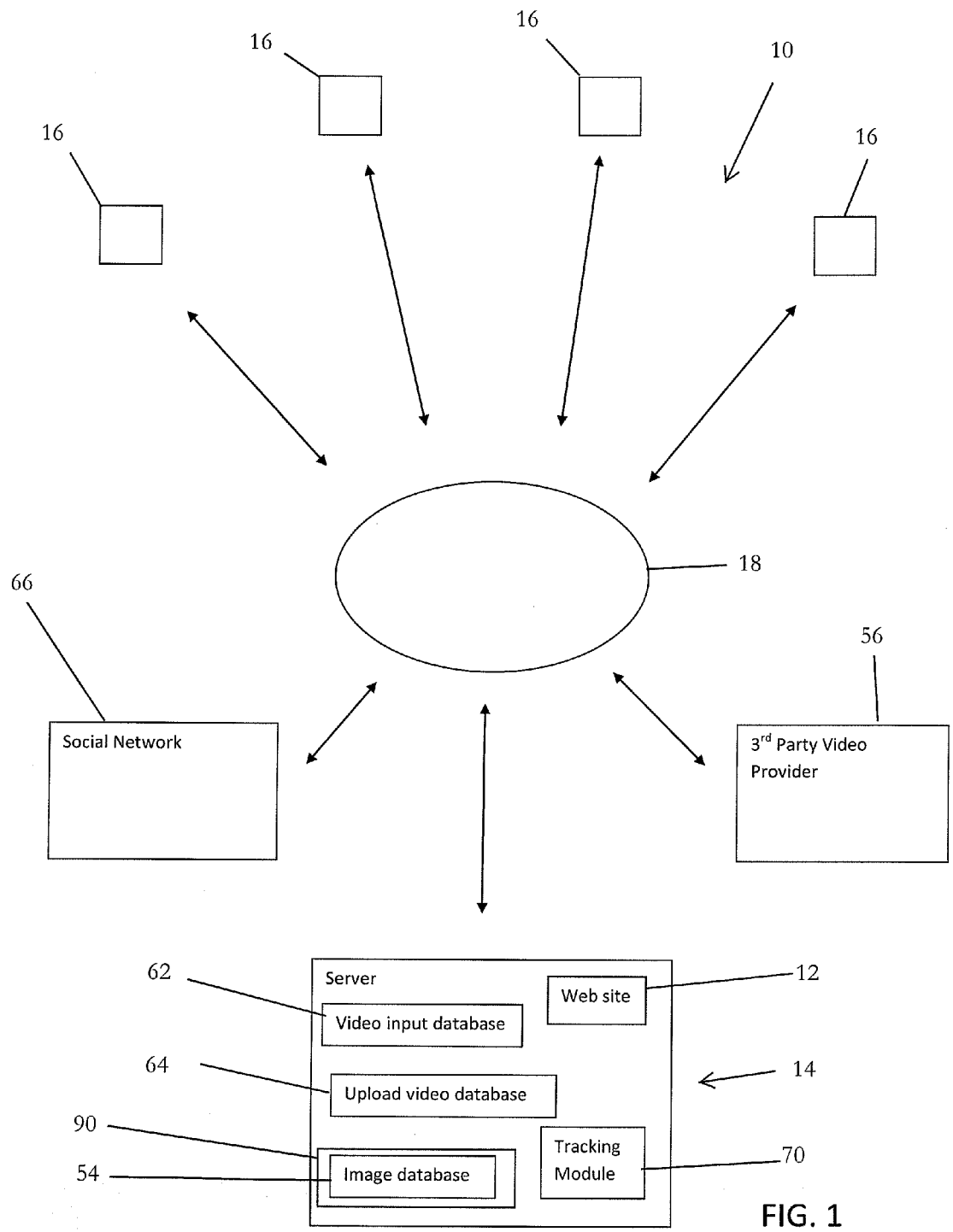
FIG. 1 is a schematic of the present system.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as a basis for teaching one skilled in the art how to make and/or use the invention.

With reference to FIGS. 1 to 16, and in accordance with a preferred embodiment, the present invention relates to a web based video tagging system 10 which allows users 16 to actively interact with online video content via a website 12 maintained on a remote server 14. The system 10 works outside of the video and is independent from the video. The present system 10 provides a web-based social utility that offers a mechanism by which users 16, interacting with the present system 10 via various electronic devices, for example, PCs, mobile electronic devices, laptops, etc., may actively interact with online video content to provide, discover and share information about products, people, places, and things appearing in the videos.

The present system 10 does not merely provide a technology application, but offers a community website environment. Instead of using the present system 10 for the purpose of simply viewing and sharing videos, the present system 10 encourages users 16 to engage in learning more about the information in video content, contributing their own knowledge and sharing that information with friends and others in the community.

All interactions with videos and tagging are tracked. The present system 10 tracks all user impressions of videos and tags. The present system 10 further tracks all click-throughs of tags including those tagged enhanced videos that are embedded/shared on third party sites. A tracking module 70 of the server monitors impressions and click-throughs. The tracking module 70 employs a combination of custom PHP: Hypertext Preprocessor ("PHP") and Google® Analytics. Google Analytics is an enterprise-class web analytics solution that gives users insights into website traffic and marketing effectiveness. The solution allows users to see and analyze traffic data. Briefly, the videos 22 and tags 24 are displayed on a third party site as they are pulled from the main server 14 of the present system 10. As a result, basically any requests the server 14 of the present system 10 receives for a video 22 or tag 24 to be displayed is captured and stored for further use (same goes for interaction such as clicking a tag). Wherever the tag 24 enhanced videos 22 appear on the World Wide Web ("WWW"), the present system 10 is capable of tracking interactions therewith.

Briefly, the video tagging system 10 includes a server 14 hosting a website 12 providing users with an interface 20 through which users 16 may interact with the video tagging system 10. The system 10 also includes a tag information database 90 maintaining information regarding tags 24 created by users. The interface 20 including a video player 82 upon which video content is displayed as a video 22 and a tag display 23 presenting tags 24 associated with the video 22. The video content and the information regarding tags 24 are maintained separately. The tags 24 are created as a user 16 watches a video 22. The user 16 is prompted to identify a tag type for a tag 24 being created and provide additional information regarding the tag 24. The tag information is stored separately from a related video.

As discussed above, the present system 10 employs a server 14 through which various users 16 may access a website 12 for viewing and tagging videos. The users 16 of the present system 10 access the server 14 via a global communication network, for example, the Internet 18.

Figure 2:
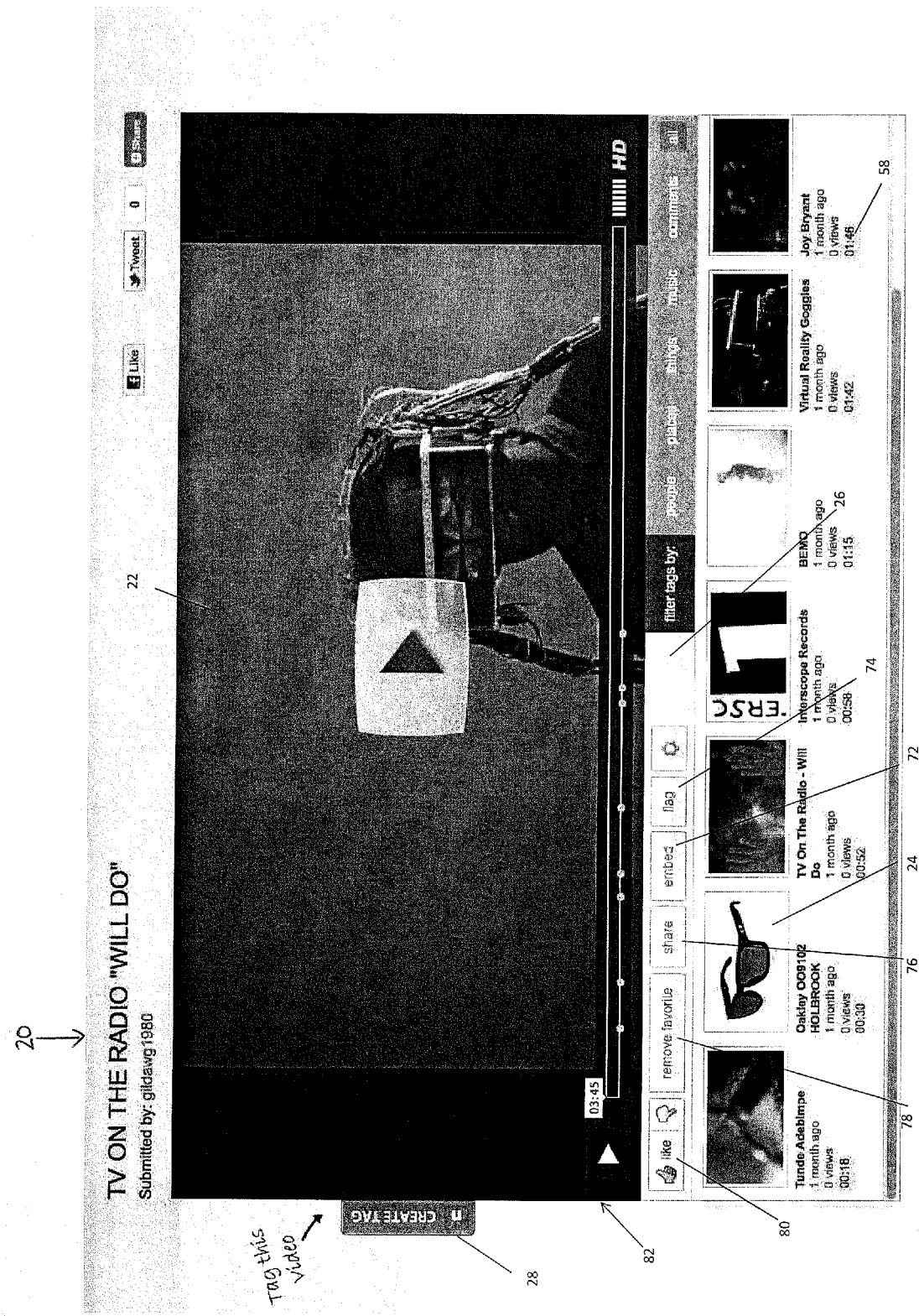
Figure 3:
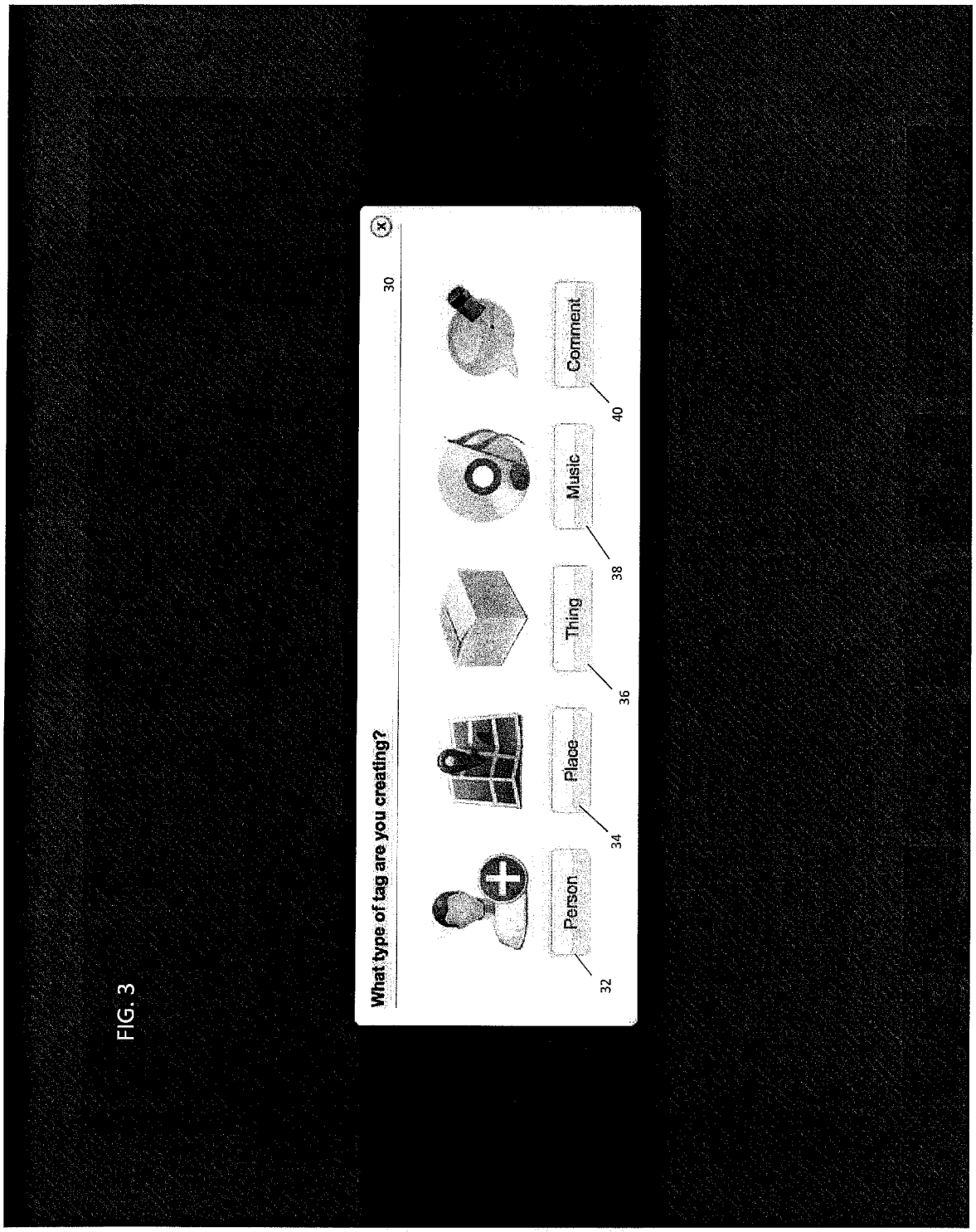
Figure 4:
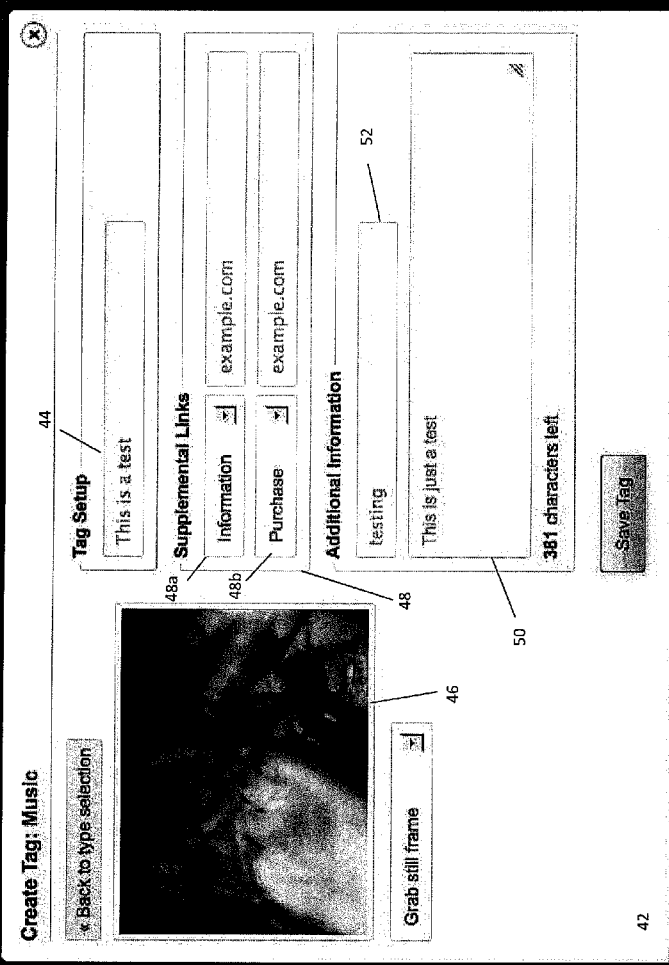
Figure 5:
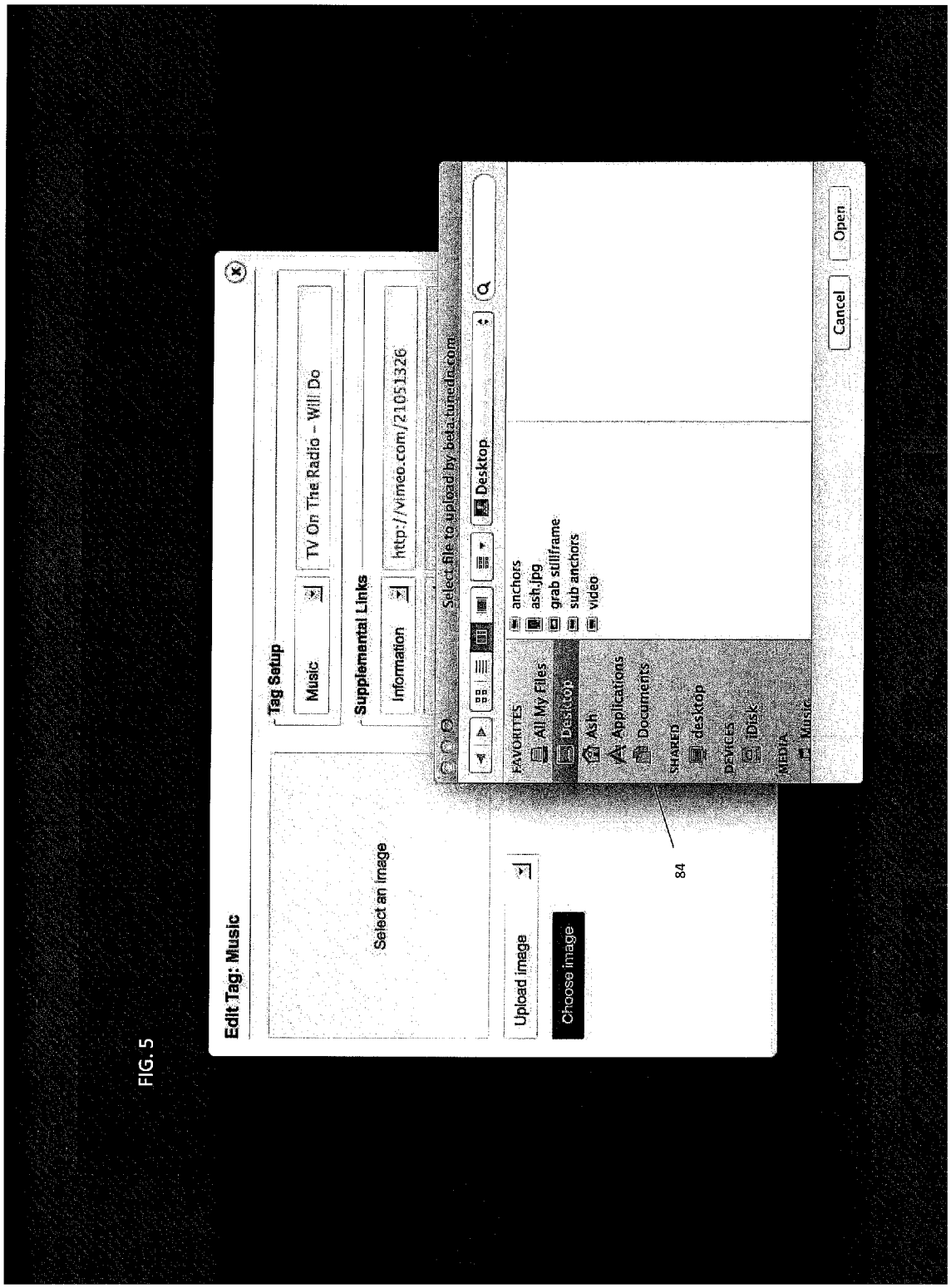

With reference to FIG. 2, an interface 20 employed in accordance with the present system 10 is disclosed. In accordance with one manner of access, the interface is accessed via the website 12 maintained on the remote server 14. As will be appreciated based upon the following disclosure, the interface 20 of the present invention may be accessed in other ways, for example, browser extensions or frameset.

Once the user 16 is logged into the system 10 using conventional log-in procedures, the user may access a video 22 for tagging in various ways discussed herein. It is appreciated that in accordance with a preferred embodiment of the present invention a user is not required to log-in to the system to view a video and its tags, but all users wishing to tag videos must be logged into the present system. Once the video 22 is accessed, whether it is through importing, uploading, browser extensions, frameset or other mechanism discussed below in greater detail, and available for viewing and tagging in conjunction with the present system 10, the user watches the video 22 with the surrounding interface 20 of the present system 10. The interface 20 permits viewing of the tags 24 from others, which the user, at his or her discretion, may decide to explore. A toolbar 26 is provided in conjunction with the tags 24 which allows the user to control and explore the tags 24 in a convenient manner. The toolbar 26 includes buttons for filtering the tags 26, an embed button 72, a flag button 74, a share button 76, a remove favorite button 78, and a like/dislike button 80.

In addition to exploring the tags 24 created by other users 16, the user may tag any specific moment within the video 22 by simply clicking on the "Create Tag" button 28 located alongside the video player 82 of the interface 20. Upon clicking the "Create Tag" button 28, the video 22 will pause and the user will be provided with a tag type screen 30 giving the user the option of choosing what type of tag they are creating (see FIG. 3). In particular, the user will be asked to identify whether that tag relates to a Person 32, Place 34, Thing 36, Music 38 or Comment 40. Upon selecting which type of tag they are creating, the user is forwarded to an additional information page 42 (see FIG. 4) where they can input additional information about the tag they are creating, for example, the user will be asked to specify whether the tag relates to the Title 44, Image 46, URL 48 (it is appreciated in accordance with a preferred embodiment of the present invention there are two types of URL's requested; Information URLs 48a and Purchase URLs 48b), Description 50, or Keywords 52 associated with the video 22 being viewed. It is appreciated all tags will be time stamped for correlation with the specific moment of the video 22 to which they relate.

With regard to the incorporation of an image into tag, the user 16 can also upload their own image for the tag (see FIG. 5) or they can elect to grab a still frame (see FIGS. 6, 7 and 8) from the video 22 where the tag appears. When uploading images, the user navigates their file system 10 on their own computer 84 and uploads a desired image 46 (see FIG. 9, for example) for association with the tag 24 being created. The image is then uploaded to the image database 54 of the present system 10 and the server 14 of the present system 10 will then host this image.

Figure 6:
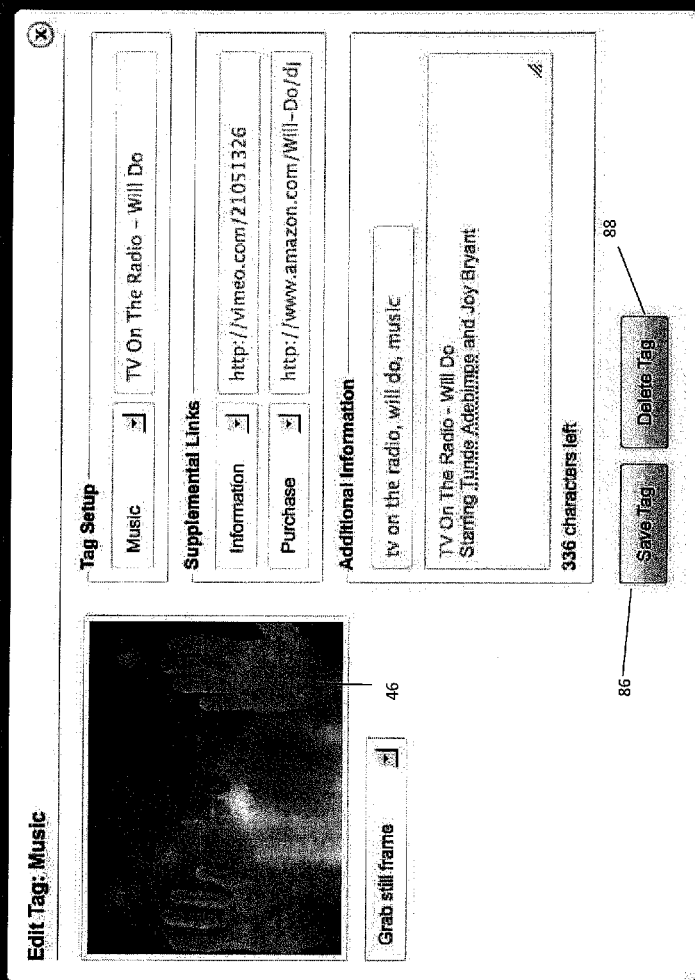
Figure 7:
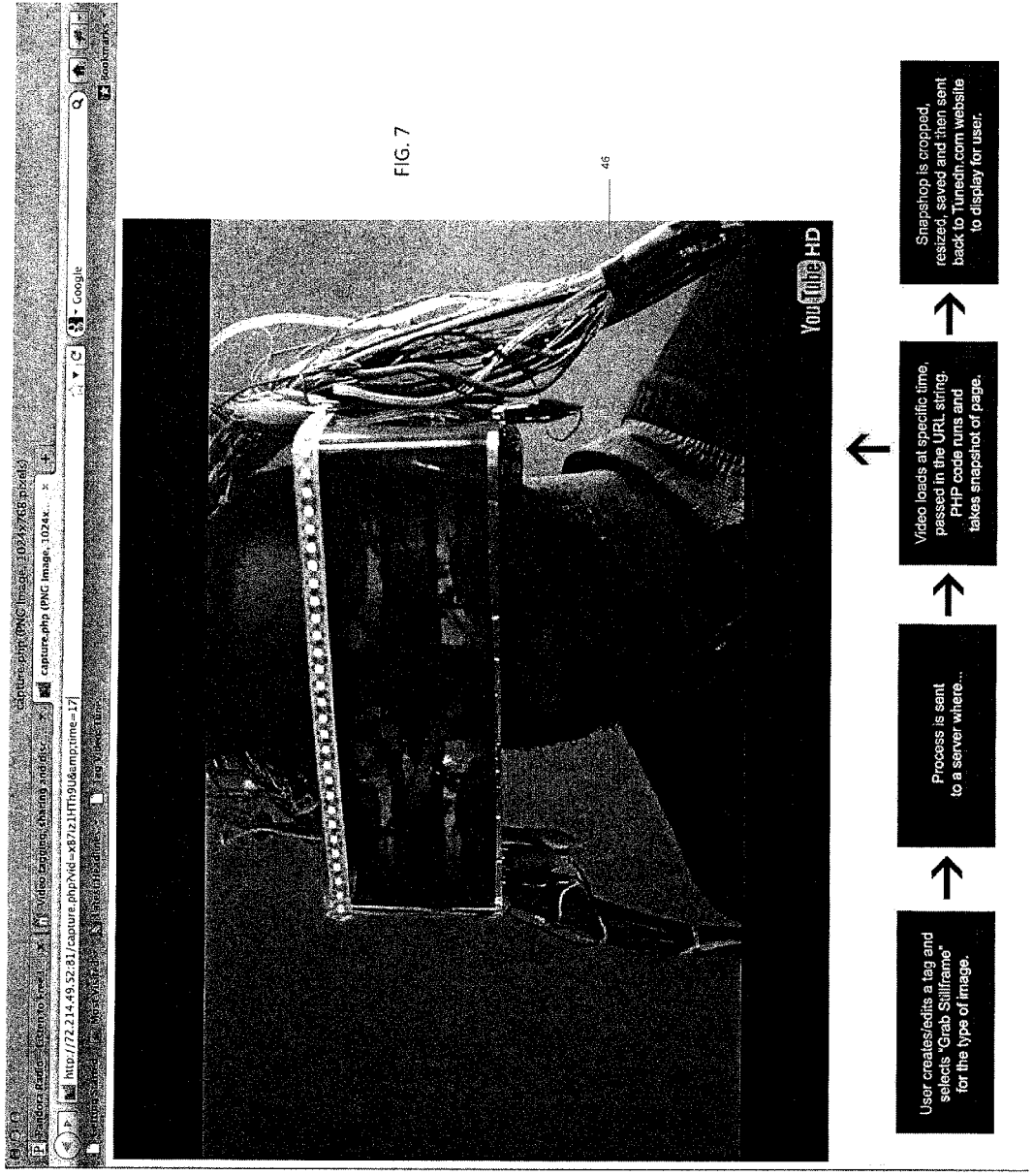
Figure 9:
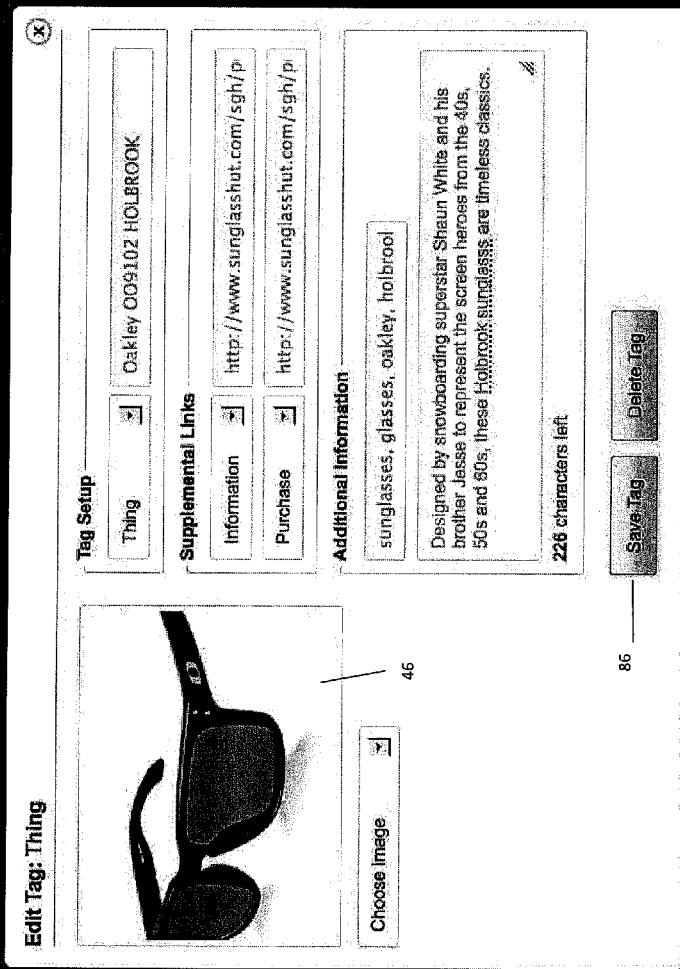

When the user wishes to grab a still frame, the user selects this option as shown in FIGS. 6, 7 and 8 and the present system 10 will send a request to the video snapshot page which will load the video in a chromeless player (that is, no video player tools—just the video), jump to the time interval specified from when that tag appears in the video, load that frame of the video, pause the video, send a response to the server to then trigger a screenshot grab software installed on the server which will take a snapshot of the page and crop and resize the image as necessary, and then send the outputted image to the tag image display. The present system 10 will also host this image 46 (see FIGS. 7 and 8, for example). In particular, the selected image is then uploaded to the image database 54 of the present system 10 for hosting by the present system 10.

Whether the user 16 uploads their own image for tagging or grabs a still frame for tagging, the users 16 can edit their tags 24 (see FIG. 9) after they have posted them. However, users 16 cannot 'edit' another user's tag. They can only edit their own tags.

After creating the tag 24, the tag 24 is saved by clicking upon the Save Tag button 86. Upon saving the tag 24, it will be viewable for anyone to see on the present system 10 or external sites. When a user tags an item from a third party site, the tag information including images 46, are stored on the tag information database 90 of the server 14 of the present system 10. As a result, if a user clicks Upload Image or Grab Stiliframe (see FIGS. 4, 5 and 6), that image is then sent to the server of the present system for storing. No browser extensions, plug-ins, or any applications are needed for this. It is done completely through code.

Figure 10:
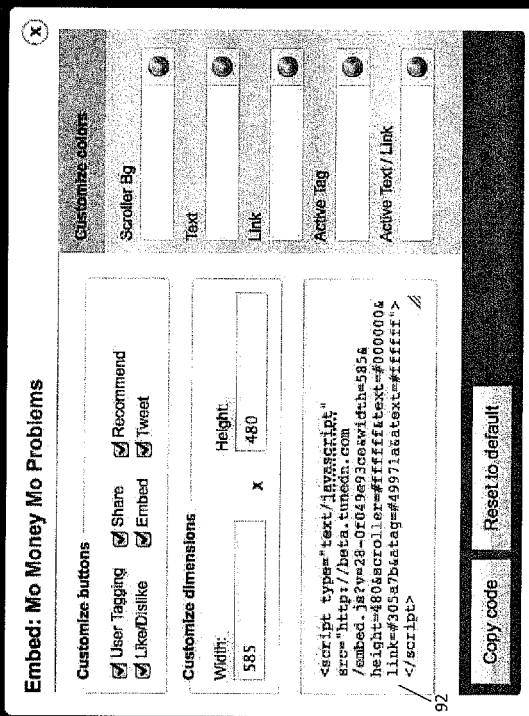
Figure 10A:
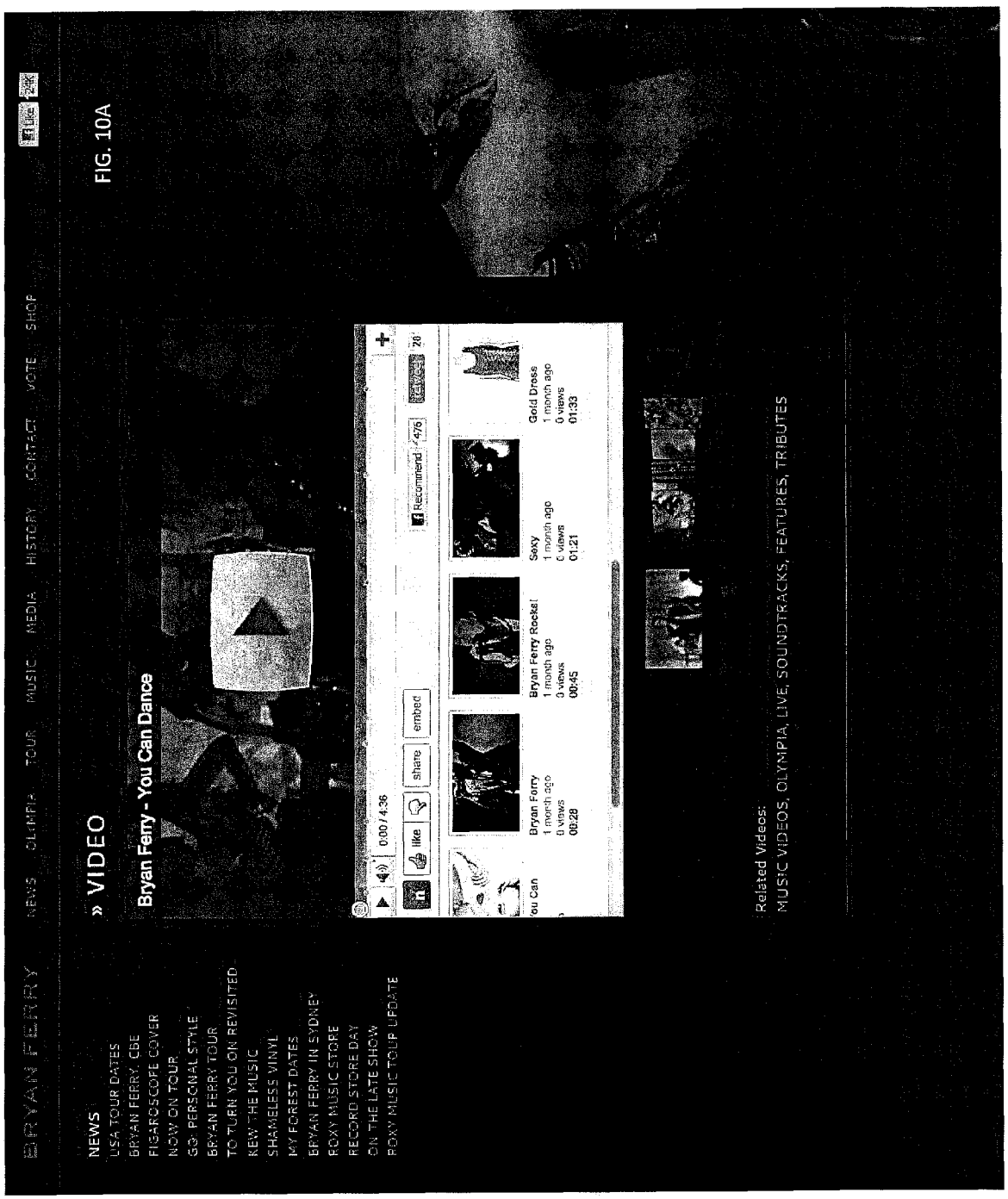

Once tagging is completed in a manner discussed below in greater detail, the user 16 can elect to embed this video 22, with the created tags 24, on an external website by clicking the embed button 72 on the interface 20. It is appreciated the user cannot alter a video using the technology of the present system. Referring to FIG. 10, the user merely supplies information that adheres to the video 22 in the manner described herein. The present system 10 uses the same technology that allows a user to embed a video seen on YouTube video on some third party site by copying/pasting that video's embed code and pasting it on their own website. The only difference with the present system is that both the video 22 and the tags 24 are being copied and pasted. Embedding on external websites is achieved by clicking on the "Embed" button 72, located next to a video 22, and copying the embed code 92 and then pasting it in to the HyperText Markup Language ("HTML") source code of the desired page on which the user wishes it to be displayed. The user can also customize the buttons (tag, like/dislike, share, embed), size dimensions and colors of the video/tags, all through this embed script. In particular, and with reference to FIGS. 2 and 10, when viewing a video 22, the user simply clicks on the "Embed" button 72 located along with the other buttons next to the video 22. A popup window (see FIG. 10) will appear where the user can customize the colors, dimensions and buttons to appear on the embedded video 22. After the user has completed their customizing, they copy the code, go to a third party site and paste the code 92. The video 22 will now appear with tags 24 on that third party site (see FIG. 10A). The present system 10 will then track all sites on which videos tagged in accordance with the present system 10 are embedded. The present system 10 will also monitor and store information regarding all impressions and click-throughs relating to these videos 22 and tags 24 generate in accordance with the present system 10.

As discussed above, and unlike other current video tagging applications, the present system 10 works outside of the video 22. In other words, the present system 10 utilizes an application that communicates with the video from a third party source 56 or one uploaded directly to the server 14 through the use of various programming protocols, for example, HTML, PHP: Hypertext Preprocessor ("PHP"), Flash® ActionScript® and JavaScript®. Content generated from the application of the present system 10 is displayed outside of the video 22 and works independently thereof. This has proven to be a more effective and universal approach to viewing videos with tags 24 and tagging videos 22.

The tags 24 appear outside of the video 22 (that is, along the bottom, left or right of the video) and are in no way developed within the video player itself. It should be appreciated the tags 24 are both literally and figuratively outside of the video 22. That is, the tags 24 are literally positioned so as to not overlay the actual video 22, that is, they are positioned on the interface 20 so as to lie along the bottom, left, right, or even the top of the video 22 being shown. In addition, the tags 24 are maintained as files completely separate from the video data. The relationship between tags 24 and the video 22 is achieved by time stamping the tags 24 and associating the tags 24 with specific moments found in the video 22 for presentation as discussed above.

Figure 15:
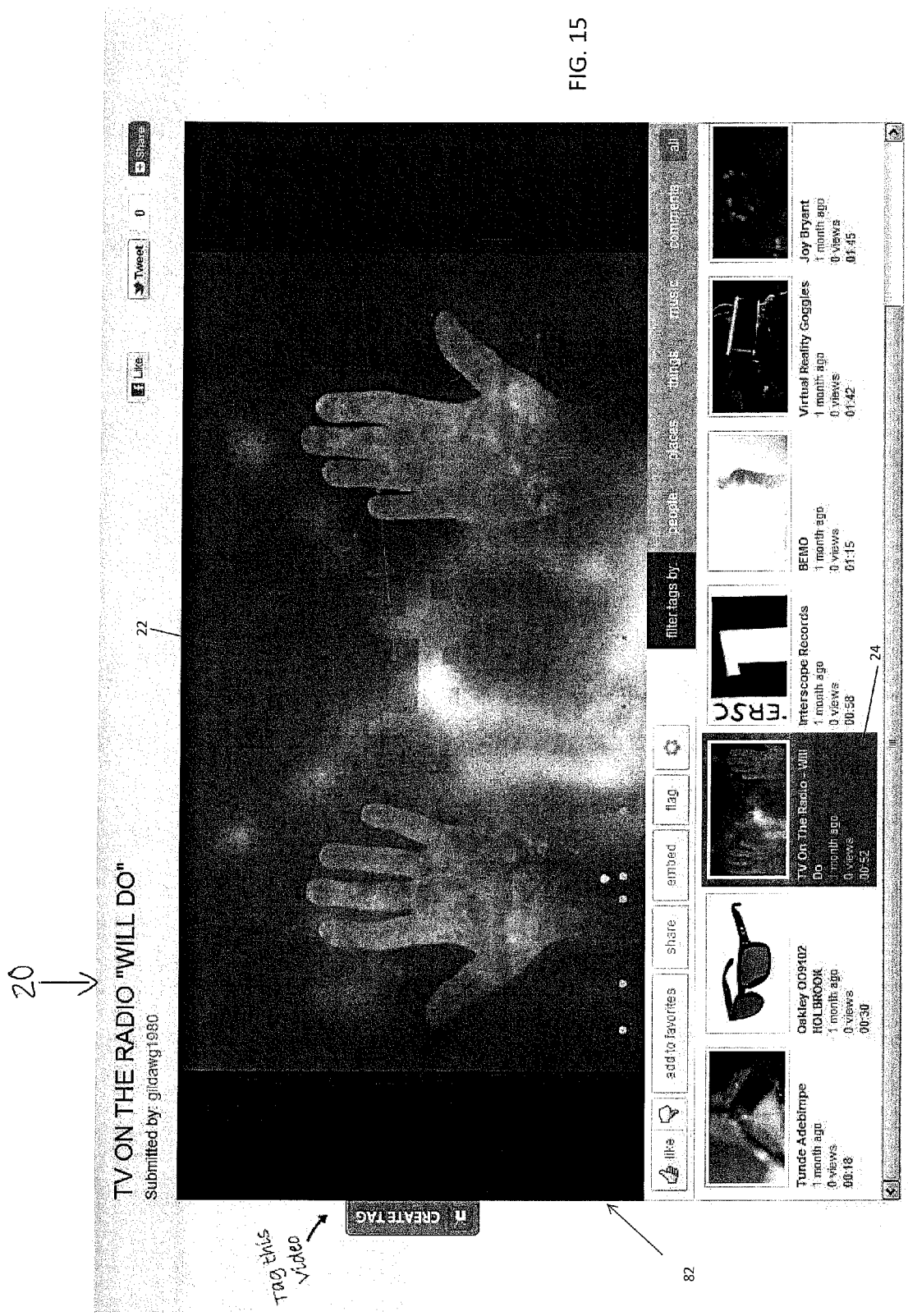
Figure 16:
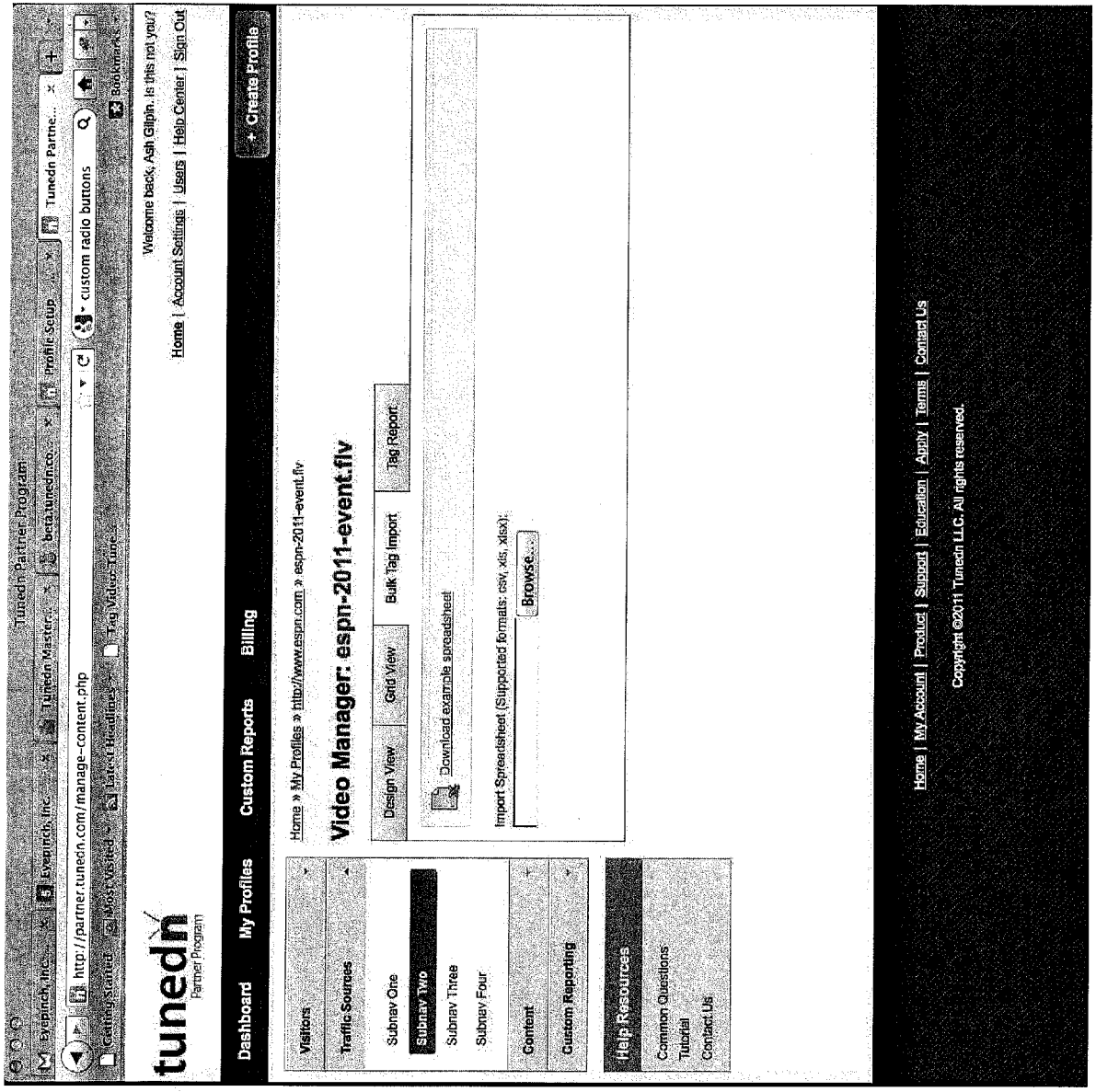

As the video plays, and with reference to FIG. 15, a tag 24 will highlight (background color of tag changes) as the timed relationship of the tag content with the video 22 approaches, and passes. The time in which the tag 24 displays is synchronized with the time line of the video 22 so that users 16 can see tags, contextually, as they appear in the video. When a tag 24 is clicked, it will direct the user to a details page where he/she can learn more about that particular item (see pictures, read more about, click on links to supporting information or where to purchase).

Also, attached to each tag is a timestamp link 58. When this timestamp link 58 is clicked, it will fast forward or rewind the video 22 to where that specific tag 24 appears in the video 22. As such, a user may scroll through the tags 24 associated with a particular video 22, identify a tag 24 of interest and move directly to the associated portion of the video 22 by simply clicking on the timestamp link 58.

As mentioned above, instead of tagging being done 'inside' the video player, the present system 10 tags 'outside' of the video player 82. This way, the video 22 and tags 24 are completely separate from one another and act independently of one another, but communicate with each other. The present system 10 achieves this separation by a combination of server side and client side programming/scripting that allows the present system 10 to communicate with the video 22. PHP, JavaScript and Flash ActionScript are proprietarily used in coding.

Keeping the tags in HTML and outside of a Flash® player allows the tags to be indexed by search engines. Flash® content is not indexed by search engines. Also, keeping the tags in HTML is a more universally accepted format and allows for tags to be saved, embedded and shared more easily and on a larger scale ensuring maximum viewer compatibility.

Figure 11:
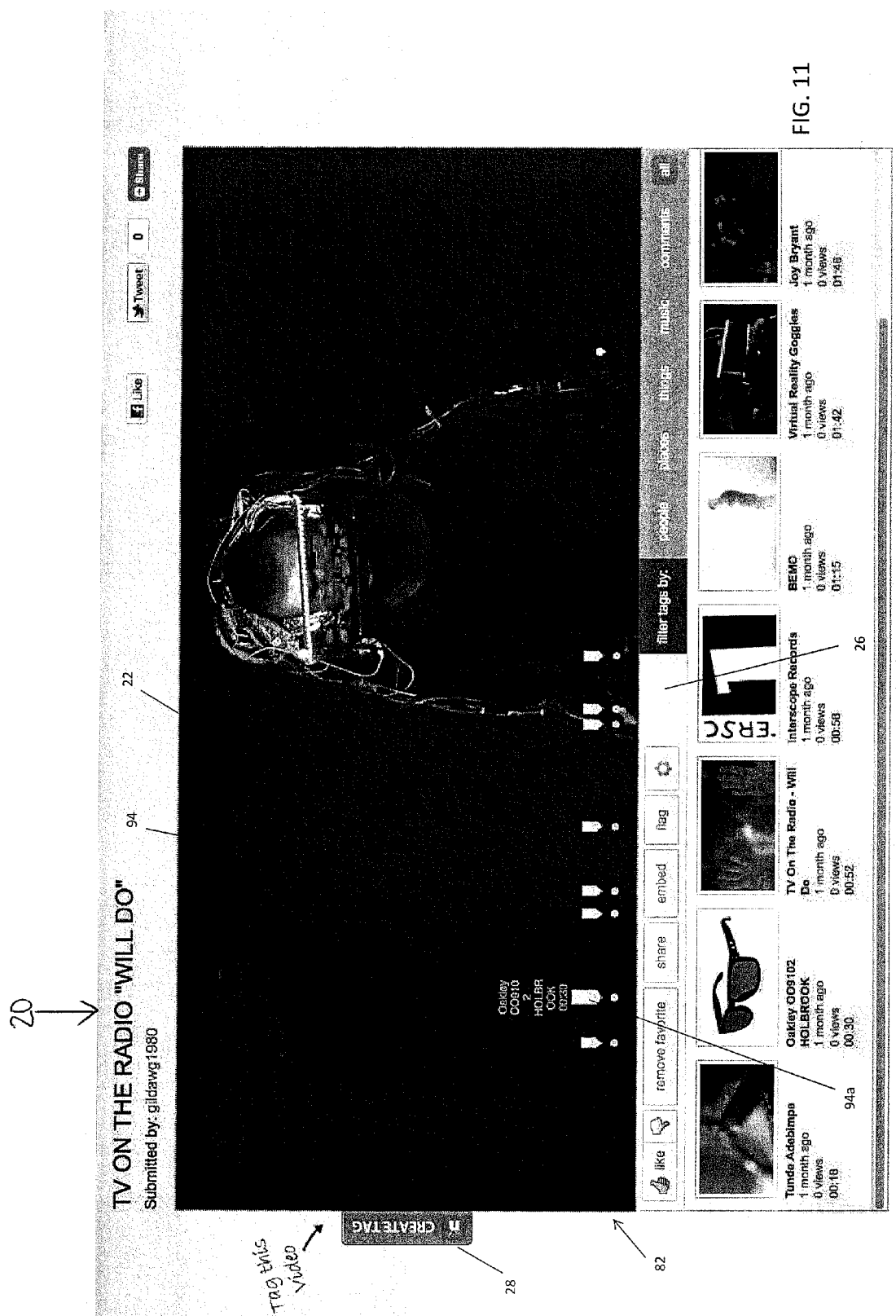
Figure 12:
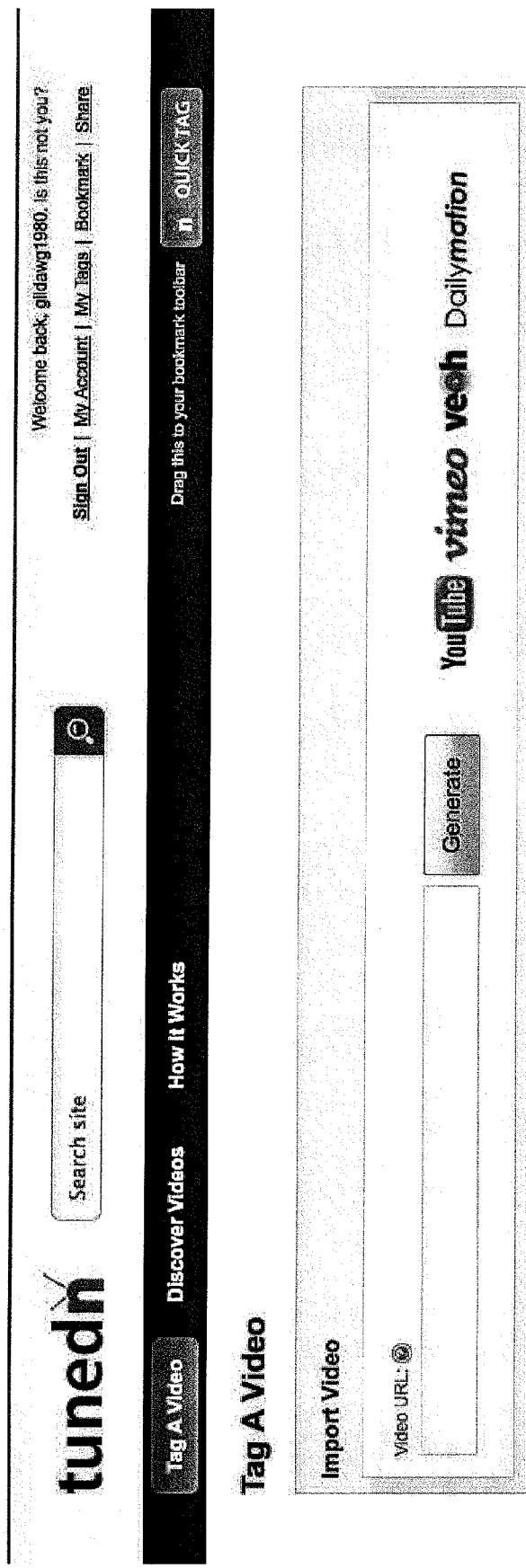
Figure 14:
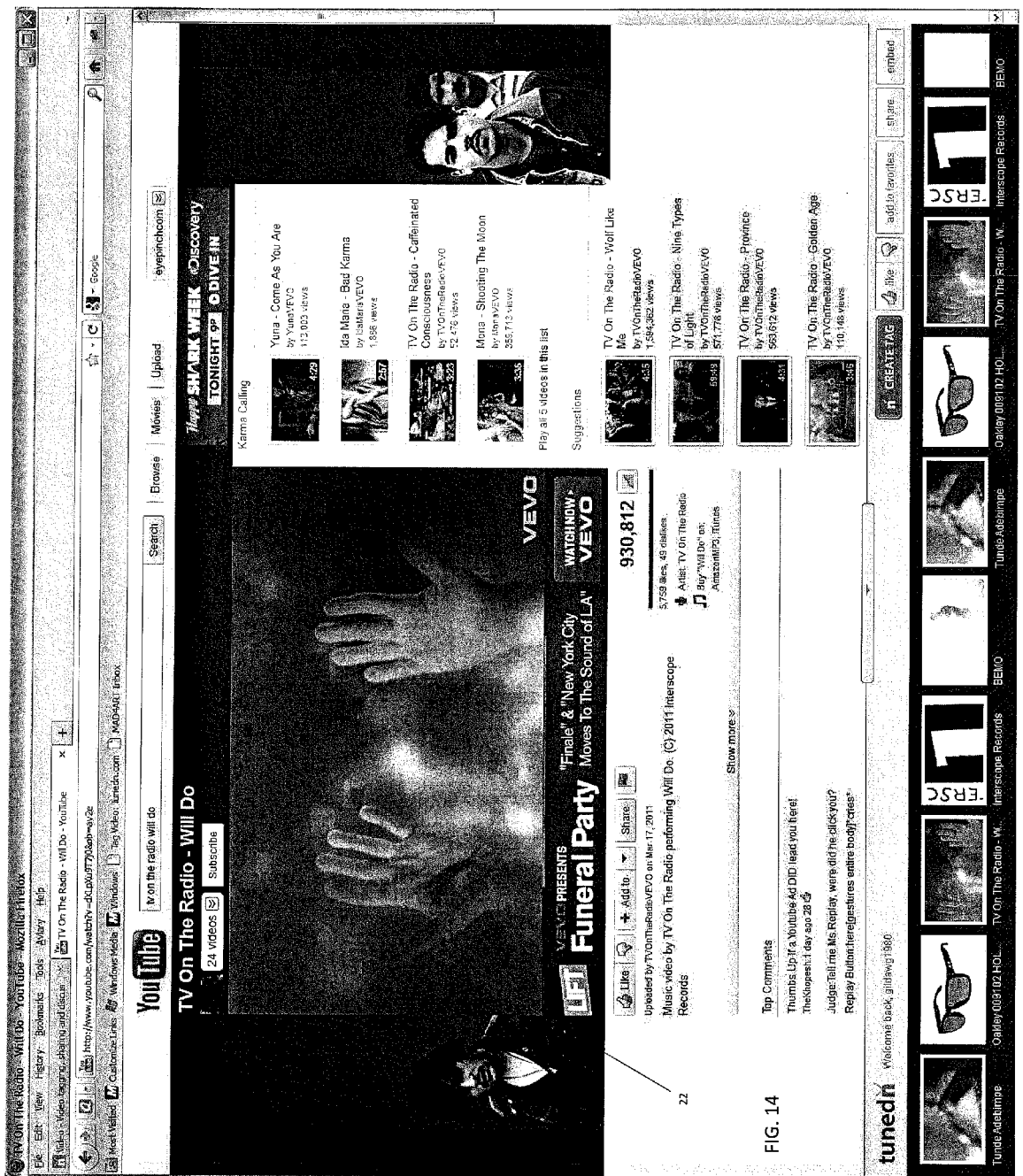

Referring to FIG. 11, for Flash® videos, we have created our own Flash® video player 82 using Flash® Action5cript® that pulls in the video 22 (third Party hosted OR an .flv) and overlays markers to show when a tag 24 will appear and anchors 94 which allow for user interaction. An anchor 94 can be dragged left or right on the timeline to adjust it's time. Tags 24 appearing at the same time can be grouped into one (1) anchor 94a or sub anchors 94b (see FIG. 8). Upon dragging a grouped anchor 94, all of the individual tags 24 associated with that group will constrain their position to the drag. Double-clicking on any anchor 94 will trigger the tag editing pane so that a user can modify tag details.

For HTML5 videos, the user interface of markers and anchors is the same as that of the Flash® version; however, it's built using HTML5, (55, and JavaScript® and is therefore natively supported by any media display device that supports HTML5.

Other currently available video tagging applications are built completely with Flash require the video publisher to create the tags, do not allow for users 16 to create tags, and display tags directly within the Flash® video content. We have created both HTML5 and Flash® versions of our application that allow for both the video publisher (the one posting the video) and user (the one viewing the video) to tag specific moments within video. As discussed above, such tags include, but are not limited to, People, Products, Places, Things, Music and Comments. These tags appear outside of the video in a viewing pane that displays the tagged content beneath or to either side of the video so that it does not obstruct the video.

Think of it like this, people go to YouTube® to watch and share video. People will go to the present system 10 to watch and share video, but additionally, contribute and learn more about the content of video they are watching. What city was that in the movie "When Harry Met Sally"? What motorcycle was Matthew McConaughey riding in that movie "How To Lose A Guy in 10 Days"? What dress was Jennifer Lopez wearing at the Oscars? etc. Both the video publisher and user (viewer of the video) will be able to tag video with such supplemental information.

As discussed above, videos may be accessed for tagging in various manners. For example, videos may be imported to the server of the present system 10 for viewing and tagging in accordance with the present invention (see FIGS. 12 and 13). A user can visit the present system 10 and import a video 22 in to the site by simply copying and pasting a Uniformed Resource Locator ("URL") 96 from a third party video hosting provider 56 such as YouTube®, Vimeo™, Veoh™, DailyMotion™, etc. The URL 96, as well as other information identifying the video being imported, is maintained in a video input database 62. After a specified URL 96 has been placed in the video input database 62 of the present system 10, the video from that URL 96 is loaded in to the present system 10 and is ready for tagging via the user interface 20. It is appreciated that a user can also supply a direct link to a video file they host on their own site. For example: www.mysite.com/myvideo.flv could be imported to tag on the present system.

In addition to importing videos, a user can upload a video directly to the uploaded video database 64 of the present system 10. The uploaded video database 64 of the present system 10 will convert the uploaded video into multiple video formats allowing viewing on the web and mobile devices. The tagging process for uploading video is exactly the same as tagging from an imported video; the only difference is that the present system 10 hosts these uploaded videos.

For video producers with large volumes of videos and tags, the present system 10 offers a methodology for bulk import of video content. In particular, and using the interface shown in FIG. 16, upon creating an account on the present system 10, users 16 can elect to import their videos in bulk from external sources such as YouTube®, Vimeo™ and other third party video sharing websites 56 to allow for quick and easy access to tagging these videos. Licensees will be able to pre-populate an Excel Spreadsheet and upload to present system 10 to allow for bulk importing of videos and related tags.

Viewing and tagging of videos may also be achieved using a browser extension adapted for the major web browsers. Browser extensions allow developers to add functionality to selected browsers and enhance the user interface in a way that is not directly related to the viewable content of web pages. These extensions allow the present system 10 to incorporate functionalities into various browsers that will permit tagging in accordance with present invention when users 16 access various third party websites including video content a user wishes to tag. The browser extensions employed in accordance with the present invention will also allow users 16 to view tagging of others when they visit third party websites.

More particularly, the browser extension in accordance with the present invention will allow users 16 the ability to view tags on video hosting services such as YouTube®, Vimeo™, Veoh™, DailyMotion™ and others and tag those videos directly on those websites without having to first go to the server or website 12 of the present system 10. A user will simply need to create an account on the present system 10 and download the browser extension for this capability. The browser extension of the present system 10, when downloaded by a user, will allow a user to see tags, create tags and edit tags directly on other websites where compatible video appear (e.g. YouTube®, Vimeo™, Break™, DailyMotion™, etc.) without having to be directly logged into the present system 10.

It is also contemplated, the present system may be provided with a frameset version integrated into the website of the present system. Essentially, and with reference to FIG. 14, a link is provided, that when clicked on, will open a frameset 98 where the interface 20 of the present system 10 will reside in one frame and a video 22 from a third party site will be viewed in the other frame 100. If a user were to navigate to a third party site such as YouTube, for example, and locate a video— the frameset would detect a taggable video and allow the user to view/create/edit tags for that video. No extensions, plug-ins or any applications are required for this functionality.

The present system 10 also offers a mechanism by which video viewing and tagging may be achieved through the use of a mobile electronic device. The present system 10 provides a mobile application that allows users 16 to tag videos directly on their phone and upload the tagging information to the present system 10. Uploading of such information may also be achieved through third party social network sites 66, such as, FACEBOOK®.com. Viewers of such video, whether on the present system 10 or third party sites such as FACEBOOK®, can see the video along with associated tags. The present may further be implemented via a users 16 FACEBOOK® page, or other social network site, by installing an application specifically designed for interaction with the social network site to show and share tagged videos directly on their FACEBOOK® page, or other social network page. Similarly, users 16 watching and interacting with Internet-ready television and game consoles can install application associated with the present system 10 to permit viewing and interaction with tags associated with video they are viewing.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A video tagging system allowing a video publisher or public users to actively interact with video content, comprising:
    a server hosting a website providing users with an interface through which users may interact with the video tagging system;
    a tag information database maintaining information regarding tags created by users in HTML;
    the interface including a video player upon which video content is displayed as a video and a tag display presenting tags created by the users in the HTML associated with the video;
    the video content and the information regarding tags are maintained separately, and wherein the tags are positioned on the interface so as to not overlay the video and are positioned on the interface so as to lie and be displayed outside of the video and can be used by a user creating the tag or other users viewing the video.

2. The video tagging system according to claim 1, wherein the information regarding tags is stored separately from video content.

3. The video tagging system according to claim 1, wherein the video content is stored on the server and is uploaded to the server.

4. The video tagging system according to claim 1, wherein the video content is stored on a third party site and imported to the server.

5. The video tagging system according to claim 1, wherein the video content is maintained on a third party site and is accessed via a frameset application.

6. The video tagging system according to claim 1, wherein the interface includes a Create Tag button allowing a user to create a tag relating to the video and the tag is stored in the tag information database.

7. The video tagging system according to claim 6, wherein the tag is embedded in a third party site.

8. The video tagging system according to claim 6, wherein the tag includes a title, an image, an information URL, a purchase URL, a description, or keywords associated with the video.

9. The video tagging system according to claim 1, wherein the tag is highlighted as a timed relationship of the tag with the video approaches and passes.

10. The video tagging system according to claim 1, wherein the video tagging system is web based.

11. The video tagging system according to claim 1, wherein the tag information database is maintained on the server.

12. The video tagging system according to claim 1, further including a tracking module that tracks all click-throughs of tags.

13. The video tagging system according to claim 1, wherein the interface includes a toolbar including buttons for filtering tags, an embed button, a flag button, a share button, a remove favorite button, and a like/dislike button.

14. A method for video tagging, comprising:
watching a video;
prompting a user to identify a tag type for a tag being created in HTML;
prompting the user to provide additional information regarding the tag; and
storing information relating the tag separately from a related video wherein the tag is positioned on an interface so as to not overlay the video and is positioned on the interface so as to lie and be displayed outside of the video and can be used by a user creating the tag or other users viewing the video.

15. The method according to claim 14, wherein the tag type is selected from the group consisting of a person, a place, a thing, music and a comment.

16. The method according to claim 14, wherein the additional information is selected form the group consisting of a title, an image, an information URL, a purchase URL, a description, and keywords.

17. The method according to claim 14, wherein the tag is synchronized with the video.

18. The method according to claim 14, further including the step of embedding the tag on a third party site.

* * * * *

UNITED STATES PATENT AND TRADEMARK OFFICE
CERTIFICATE OF CORRECTION

PATENT NO. : 8,467,660 B2
APPLICATION NO. : 13/215618
DATED : June 18, 2013
INVENTOR(S) : Ash K. Gilpin Page 1 of 1

It is certified that error appears in the above-identified patent and that said Letters Patent is hereby corrected as shown below:

In the Claims:

Column 10, lines 8-11, cancel the text beginning with "16. The method" to and ending "keywords.", and insert the following claim:

--16. The method according to claim 14, wherein the additional information is selected from the group consisting of a title, an image, an information URL, a purchase URL, a description, and keywords.--

Signed and Sealed this
Sixth Day of August, 2013

Teresa Stanek Rea
*Acting Director of the United States Patent and Trademark Office*